(12) United States Patent
Sahasrabudhe et al.

(10) Patent No.: US 8,385,523 B2
(45) Date of Patent: Feb. 26, 2013

(54) SYSTEM AND METHOD TO FACILITATE VOICE MESSAGE RETRIEVAL

(75) Inventors: Manisha Sahasrabudhe, Santa Clara, CA (US); Radha Iyer, San Jose, CA (US); Nidhi Narang, Fremont, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1358 days.

(21) Appl. No.: 11/232,483

(22) Filed: Sep. 21, 2005

(65) Prior Publication Data

US 2007/0071186 A1 Mar. 29, 2007

(51) Int. Cl.
*H04M 1/56* (2006.01)
*H04M 1/64* (2006.01)

(52) U.S. Cl. .................. 379/142.01; 379/88.22

(58) Field of Classification Search ............... 379/88.19, 379/88.22
See application file for complete search history.

(56) References Cited

U.S. PATENT DOCUMENTS

| | | | |
|---|---|---|---|
| 2004/0146145 A1* | 7/2004 | Kiser et al. | 379/88.16 |
| 2005/0059384 A1* | 3/2005 | Kuusinen et al. | 455/414.1 |
| 2006/0025114 A1* | 2/2006 | Bales et al. | 455/413 |
| 2006/0067498 A1* | 3/2006 | Plas et al. | 379/201.01 |
| 2006/0085832 A1* | 4/2006 | Groff et al. | 725/106 |

* cited by examiner

*Primary Examiner* — Joseph T Phan

(57) ABSTRACT

Some embodiments provide transmission of a request to access a voice message mailbox to a voice mailbox provider, transmission of caller information to the voice mailbox provider, and reception of a voice message associated with the caller information from the voice mailbox provider. According to various embodiments, the caller information may be associated with a selected contact, with a caller who initiated a missed voice call, and/or with a particular voice message mailbox.

20 Claims, 17 Drawing Sheets

SYSTEM AND METHOD TO FACILITATE VOICE MESSAGE RETRIEVAL

BACKGROUND

1. Field

Embodiments may generally relate to retrieving voice messages. More particularly, some embodiments are concerned with efficiently retrieving voice messages in non-chronological order.

2. Description

The features of a conventional cellular telephone may provide a user with many conveniences. These features may increase the efficiency and/or effectiveness with which the user performs daily tasks. Such features may include, but are not limited to, mobile telephone communication, text messaging, silent alarms (e.g., "vibrate mode"), calendaring, and voice messaging.

Conventional voice messaging allows a user to retrieve voice messages that are stored in a voice message mailbox associated with the user. For example, a caller may call a user's cellular telephone number and, if the user does not answer the call within a specified number of rings, the call may be transferred to and answered by a voice message mailbox provider. The caller may then generate (e.g., orally dictate) a voice message that is stored by the voice message mailbox provider in a voice message mailbox associated with the user.

The user accesses the voice message mailbox in order to listen to any voice messages stored therein. Typically, such access includes placing a call to a telephone number associated with the voice message mailbox provider and transmitting an access code to the provider. The provider then determines if the access code matches a predefined access code that is associated with the voice message mailbox being accessed, and, if so, presents any voice messages stored therein to the user. However, conventional systems present the voice messages in chronological order (i.e., the order in which the messages were received).

Systems are desired that may provide improved voice message retrieval.

SUMMARY

Some embodiments provide a system, method, telephone, program code and/or means to transmit a request to access a voice message mailbox to a voice mailbox provider, transmit caller information to the voice mailbox provider, and receive a voice message associated with the caller information from the voice mailbox provider.

In further aspects, one or more contacts are presented and a user instruction to retrieve a voice message associated with one of the one or more contacts is received, wherein the transmitted caller information is associated with the one contact. Other aspects include presentation of information associated with one or more missed voice calls, and reception of a user selection of one of the one or more missed voice calls, wherein the caller information is associated with a caller who initiated the missed voice call. Still further aspects may include reception of a user instruction to associate the caller information with the voice message mailbox, wherein the caller information is transmitted before the request is transmitted, and wherein transmission of the request includes transmission of a selection of the voice message mailbox from among two or more selectable voice message mailboxes.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
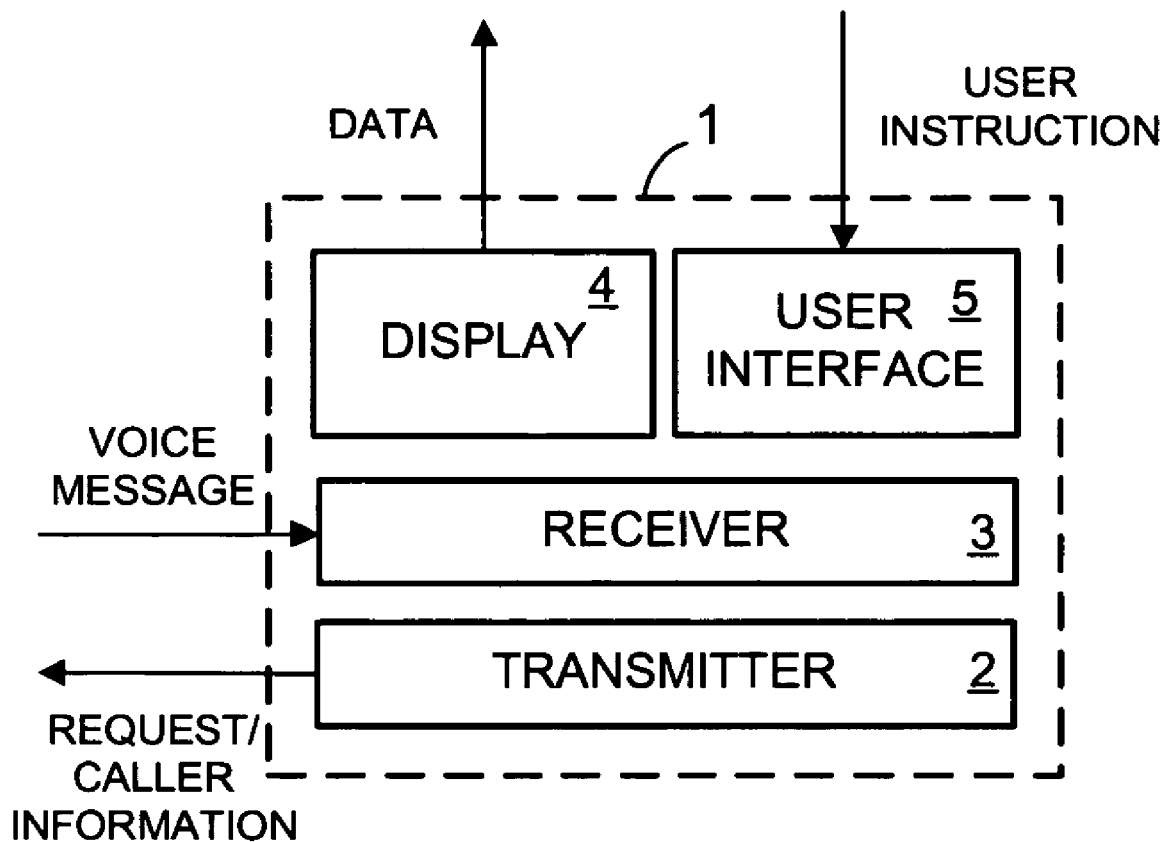
FIG. 1 is a block diagram of a system according to some embodiments.

FIG. 1 is a block diagram of device 1 according to some embodiments. Device 1 may transmit a request to access a voice message mailbox to a voice mailbox provider, transmit caller information to the voice mailbox provider, and receive a voice message associated with the caller information from the voice mailbox provider. Some implementations of device 1 may therefore provide selective receipt of voice messages. Examples thereof are provided below.

Device 1 may comprise a portable device or a fixed device, the latter including but not limited to a "land line" telephone. Examples of portable devices include cellular telephones, personal digital assistants (PDAs), digital media players, digital cameras, wireless email devices, and any other device for communicating with a voice message mailbox provider that is or becomes known.

Device 1 includes transmitter 2, receiver 3, user interface 4, and display 5. Each element of device 1 may comprise any combination of hardware and/or software components suitable for providing the functions attributed thereto herein. Two or more of transmitter 2, receiver 3, user interface 4, and display 5 may share one or more constituent components, and, in some embodiments, device 1 may include unshown elements for providing the functions described herein.

Transmitter 2 may transmit a request to access a voice message mailbox to a voice mailbox provider, and transmit caller information to the voice mailbox provider. The caller information may comprise caller ID information and/or any other information that device 1 may use to identify a caller and/or a voice message. Transmitter 2 may transmit the caller information before the request is transmitted. In some embodiments, the request includes a selection of the voice message mailbox from among two or more selectable voice message mailboxes.

Receiver 3 may receive a voice message associated with the caller information from the voice mailbox provider. The voice message may be associated with the caller information that was previously transmitted to the voice mailbox provider. According to some embodiments, the voice message was generated by a caller who is associated with the caller information.

Display 4 may comprise any system for presenting information that is or becomes known. According to some embodiments, display 4 presents one or more contacts to a user. The contacts may comprise any information representing a caller who may leave a voice message, and may comprise a list of names stored in device 1. The list may be provided by an "Address Book" function of device 1, and may also include contact information (e.g., telephone numbers, addresses, etc.) associated with each listed contact. According to some embodiments described below, display 4 may present an indicator indicating that one or more voice messages were received by one or more of the presented contacts.

Display 4 may also or alternatively present information associated with one or more missed voice calls. This information may be provided by a "Missed Calls" function of device 1, and may include contact information (e.g., telephone number, name, address, etc.) associated with callers who initiated the missed voice calls. Display 4 may, in some embodiments, present an indicator indicating that one or more of the missed voice calls is associated with a voice message.

User interface 5 may comprise any system to receive input from a user. For example, user interface 5 may comprise on or more of a keypad, a microphone, a touchscreen, etc. User interface 5 may receive a user instruction to retrieve a voice message associated with a presented contact. In some embodiments, user interface 5 receives a user selection of one or more missed voice calls, and/or a user instruction to associate caller information (e.g., a telephone number) with a voice message mailbox. The latter instruction may be used to define a voice message mailbox for storing only voice messages that are associated with the caller information.

Figure 2:
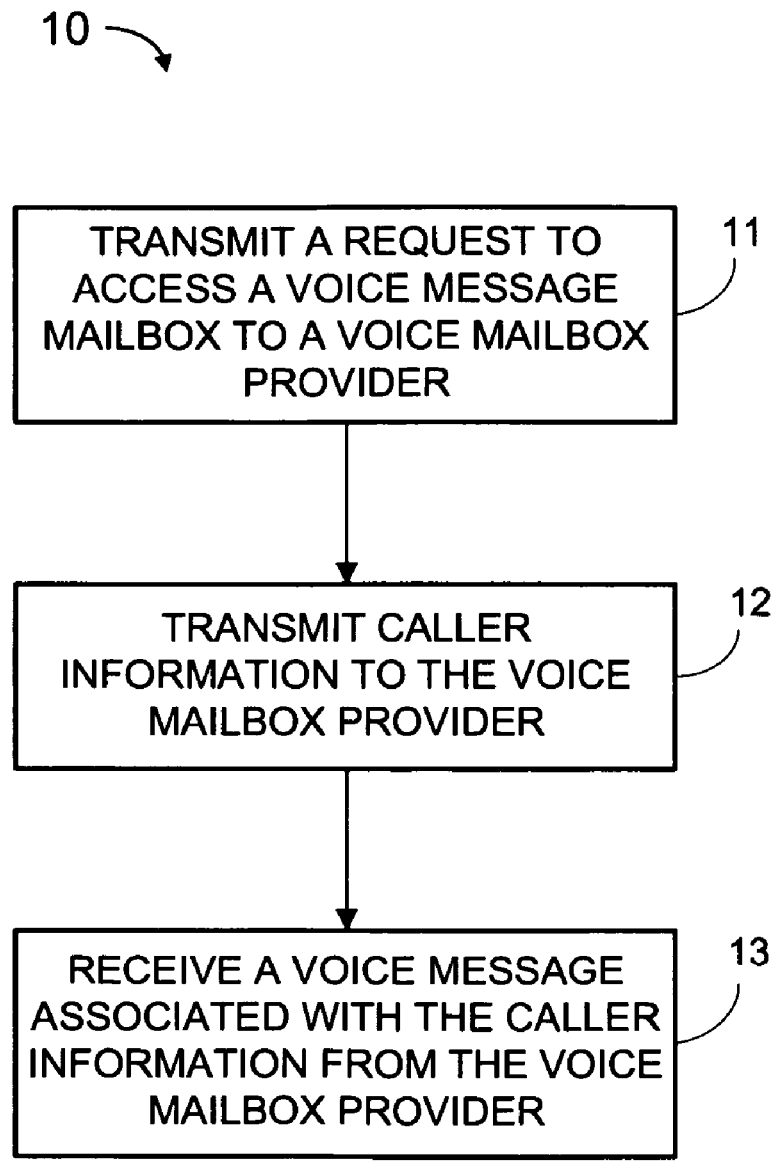
FIG. 2 is a flow diagram of a process according to some embodiments.

FIG. 2 is a flow diagram of process 10 according to some embodiments. Process 10, as well as the other processes described herein, may be executed by device 1 using any suitable hardware and/or software arrangement, and may be executed by any suitable device or devices that are or become known.

A request is initially transmitted to a voice mailbox provider at 11. The request comprises a request to access a voice message mailbox. In some embodiments of 11, transmitter 2 of device 1 transmits signals representing a request to initiate a voice call connection with the voice mailbox provider. The signals may comply with any suitable protocol, including but not limited to Time Division Multiple Access (TDMA) (e.g., GSM, D-AMPS), Code Division Multiple Access (CDMA), and CDMAOne (e.g., PCS), as well as non-cellular voice call protocols.

Continuing with the above example, device 1 may determine that the voice mailbox provider has answered the voice call using conventional telephony protocols. Device 1 may then transmit information identifying the voice message mailbox for which access is requested and a passcode or other security-related information that may be required to access the voice message mailbox. Any other system for interacting with a voice mailbox provider to access a voice message mailbox may be employed at 11.

Next, at 12, caller information is transmitted to the voice mailbox provider. The caller information may comprise a telephone number or other information that may be used to identify a voice message stored by the voice mailbox provider. According to some examples, device 1 transmits a telephone number corresponding to a particular contact at 12.

A voice message is received from the voice mailbox provider at 13. The voice message is associated with the caller information that was transmitted at 12. For example, a caller may have generated a voice message that is stored in the voice mailbox, and the caller information transmitted at 12 may be associated with the caller (e.g., a telephone number of the caller). Accordingly, the voice message generated by the caller is received at 13.

Some embodiments of the FIG. 1 system and/or of process 10 may thereby provide selective retrieval of a voice message from a voice message mailbox.

Figure 3:
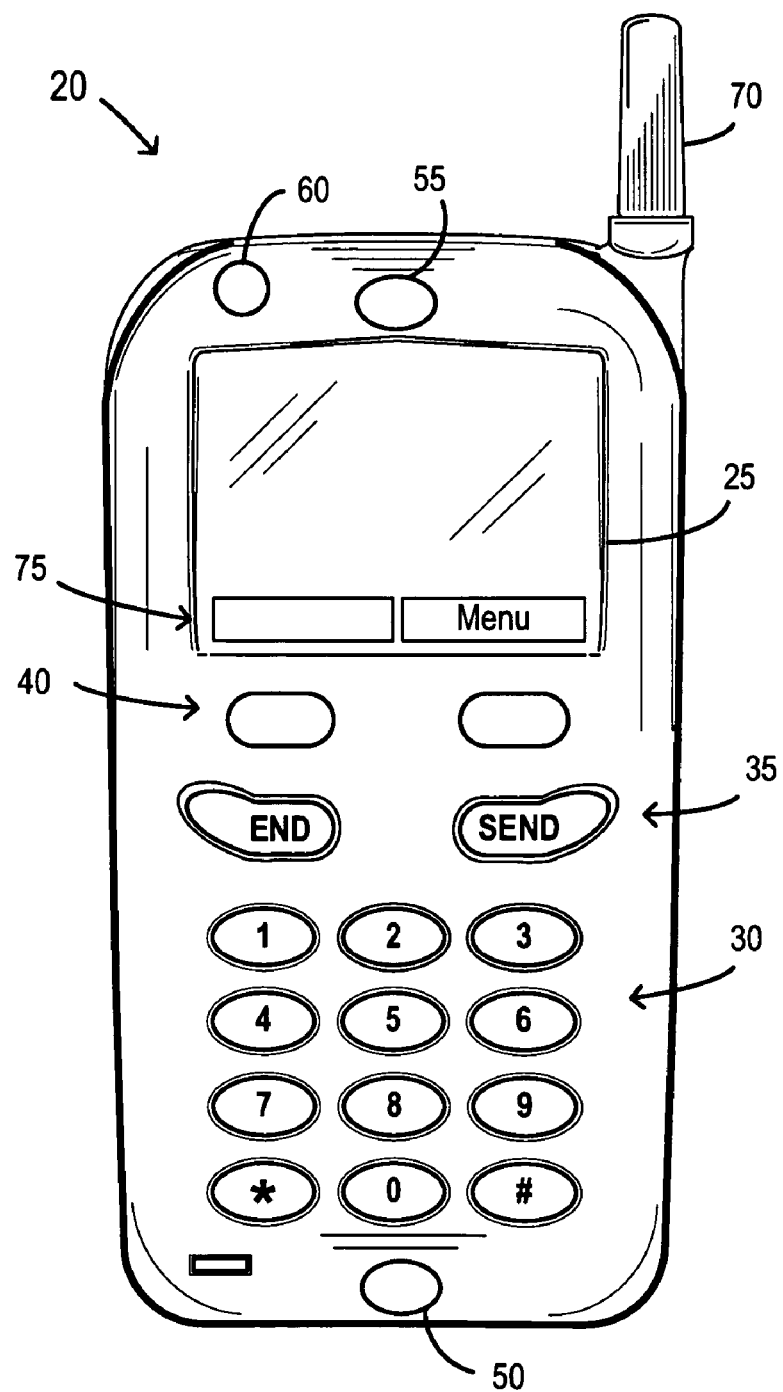
FIG. 3 is an outward view of a telephone according to some embodiments.

FIG. 3 is a schematic front elevation view of portable cellular telephone 20. Cellular telephone 20 may comprise device 1 of FIG. 1 and/or may execute process 10 according to some embodiments. Cellular telephone 20 may include conventional components, and may include program code for performing certain functions described herein. Embodiments may differ in part or in whole from cellular telephone 20.

Cellular telephone 20 may be compatible with one or more cellular communication protocols, including but not limited to those mentioned above. As also mentioned above, some embodiments operate in conjunction with non-cellular and/or non-portable devices and their associated protocols.

Cellular telephone 20 includes display 25, keypad 30, fixed function keys 35, variable function keys 40, microphone 50, speaker 55, power button 60 and antenna 70. Display 25 displays a user interface for accessing the functionality of telephone 20. Alphanumeric keypad 30 is laid out as a conventional telephone dialing keypad, and fixed function keys 35 are used, respectively, to initiate a communication and to terminate a communication. Variable function keys 40 provide functions that vary in accordance with function labels 75 displayed on display 24 above keys 40.

Microphone 50 receives audio signals that may represent speech of a user. In some embodiments, the audio signals may comprise commands for operating telephone 20, such as a command to retrieve a voice message.

Speaker 55 emits audio signals from telephone 20. The audio signals may comprise ring tones, beeps and other tones used during operation of telephone 20, and/or speech or other audio signals received from another device such as another telephone. Speaker 55 may also emit audio signals representing voice messages or other sounds received by microphone 50.

Power button 60 may be used to turn cellular telephone 20 on and off. Antenna 70 may receive and transmit radio frequency signals from and to a cellular telephone network. Antenna 70 may be configured to transmit and receive any types of signals that comply with the communication protocol of the communication network in which telephone 20 is employed.

Figure 4:
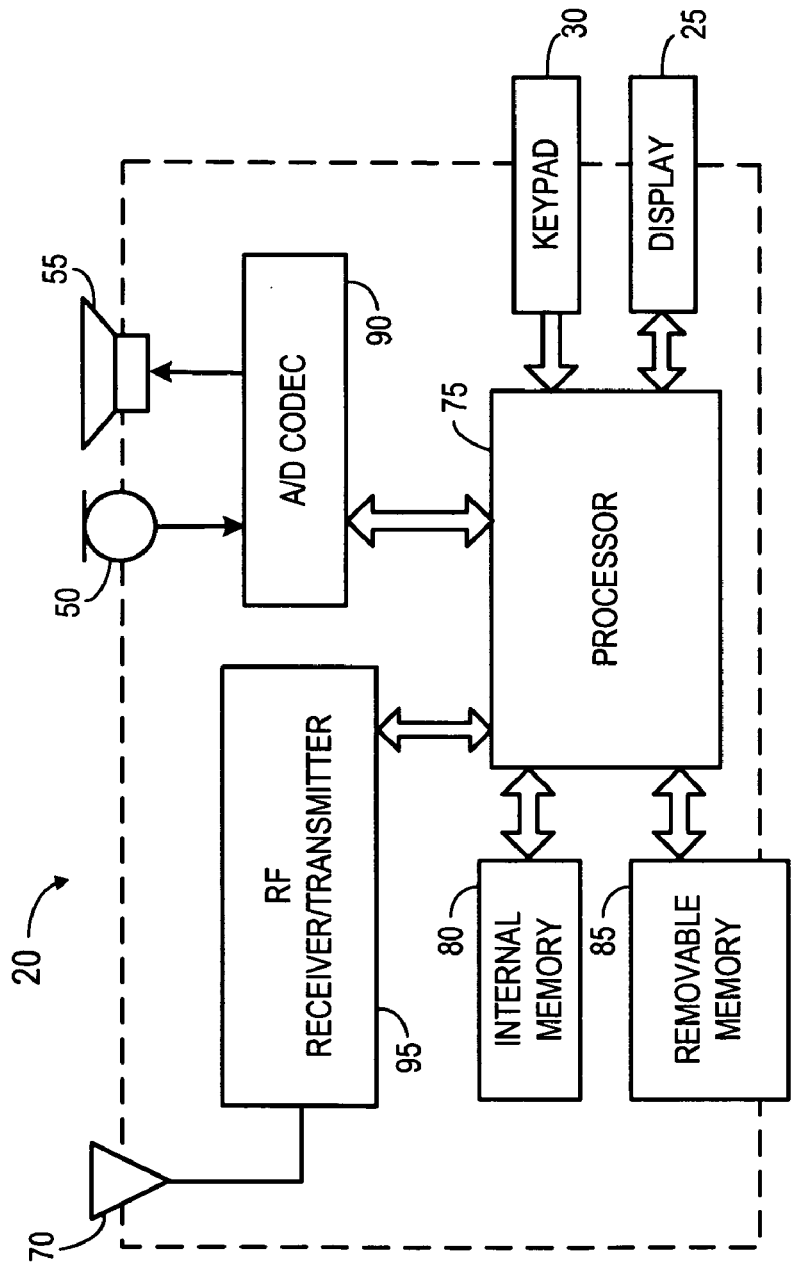
FIG. 4 is a block diagram of the internal architecture of a telephone according to some embodiments.

FIG. 4 is a block diagram of the internal architecture of cellular telephone 20 according to some embodiments. As shown, cellular telephone 20 includes processor 75, which may be a conventional microprocessor, microcontroller and/or digital signal processor (DSP) or other control circuit conventionally provided in a cellular telephone. Processor 75 is shown in communication with keypad 30 and display 25 for control thereof.

Also included in the cellular telephone 20 are internal memory 80 and removable memory 85. Internal memory 80 may include one or more of ROM (read only memory), RAM (random access memory, e.g., static RAM), and flash memory. Removable memory 85 may comprise a flash memory, a Subscriber Identity Module (SIM) card or any other removable memory that is or becomes known. Cellular telephone 20 may therefore be equipped with an interface for physically receiving and transferring data to and from removable memory 85.

Memories 80 and 85 may store program code that is executable by processor 75 to control telephone 20. The program code may include but is not limited to operating system program code, application program code, device driver program code, and database connector program code. The program code may include code to cause telephone 20 to perform functions that are described herein.

Memories 80 and 85 may also store data used in the operation of cellular telephone 20. Such data may include contacts, phone numbers, addresses, voice mailbox access numbers, voice mailbox access codes, and other data. Some or all of the data may be read-only, while other of the data may be rewritable.

Analog/digital coder/decoder (A/D codec) 90 is also in communication with processor 75. A/D codec 90 may receive analog signals from microphone 50, convert the analog signals to digital signals, and pass the digital signals to processor 75. Conversely, processor 75 may transmit digital signals to A/D codec 90, which converts the digital signals to analog signals and passes the analog signals to speaker 55. Speaker 55 then emits sound based on the analog signals.

RF receiver/transmitter 95 is operatively coupled to antenna 70. RF receiver/transmitter 95 may, in accordance with conventional practices, comprise a combination of two or more different receive/transmit modules (not separately shown) that operate in accordance with mutually different radio communication protocols to provide various services for the cellular telephone 20. For example, receiver/transmitter 95 may operate in accordance with one radio communication protocol to provide conventional two-way service for cellular telephone 20, and may operate in accordance with another radio communication protocol to provide PoC service for cellular telephone 20.

Those in the art will understand that the block diagram of FIG. 4 is simplified in a number of ways. For example, all power and power management components of cellular telephone 20 are omitted from the diagram. Also, some embodiments may employ an internal architecture somewhat different or completely different from that shown in FIG. 4.

Figure 5:
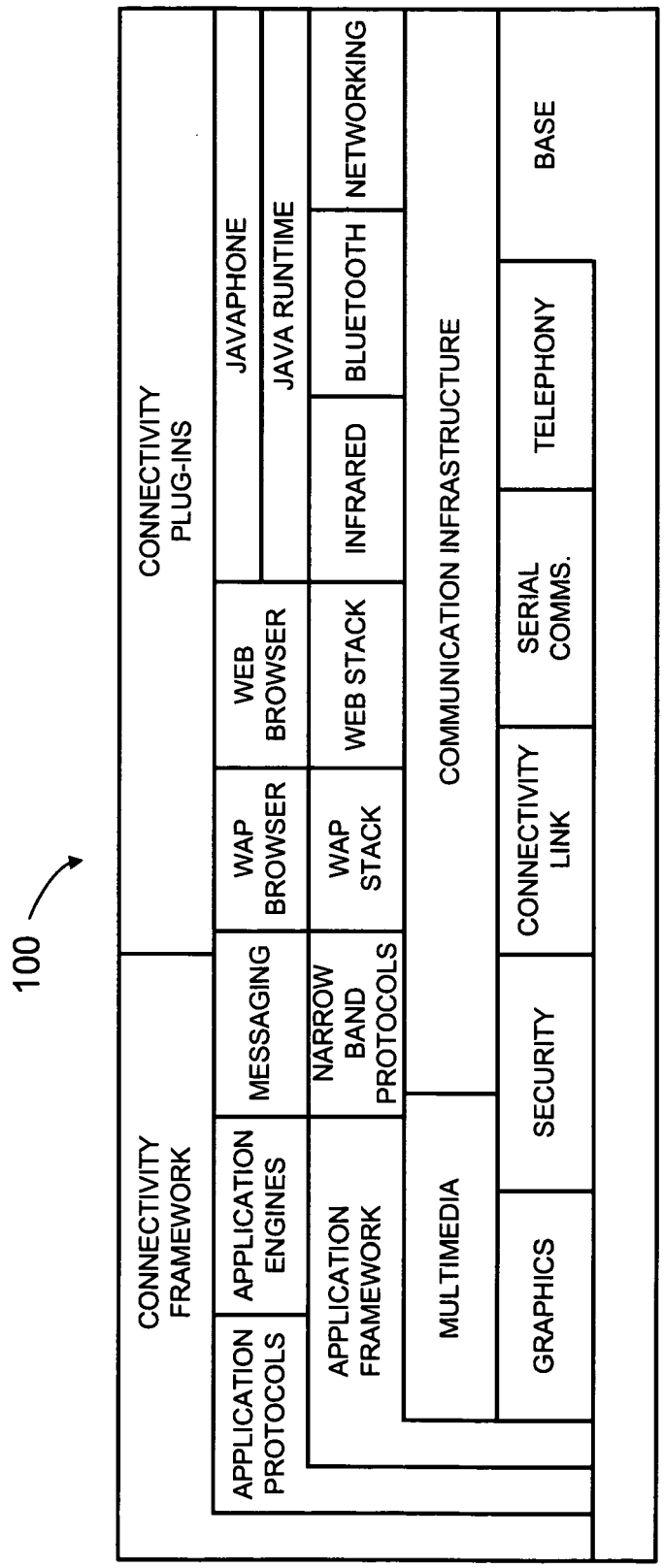
FIG. 5 is a block diagram of a telephone operating system according to some embodiments.

FIG. 5 is a block diagram of an operating system architecture that may be used in conjunction with some embodiments. Architecture 100 corresponds to the Symbian™ cellular telephone operating system. Any suitable operating system may be used in conjunction with some embodiments, including those not intended and/or usable with cellular telephones. Suitable operating systems according to some embodiments include but are not limited to Palm OS™, Windows CE™, and operating systems suitable for devices capable of transmitting text messages (e.g., landline telephones, PDAs, digital media players).

Figure 6:
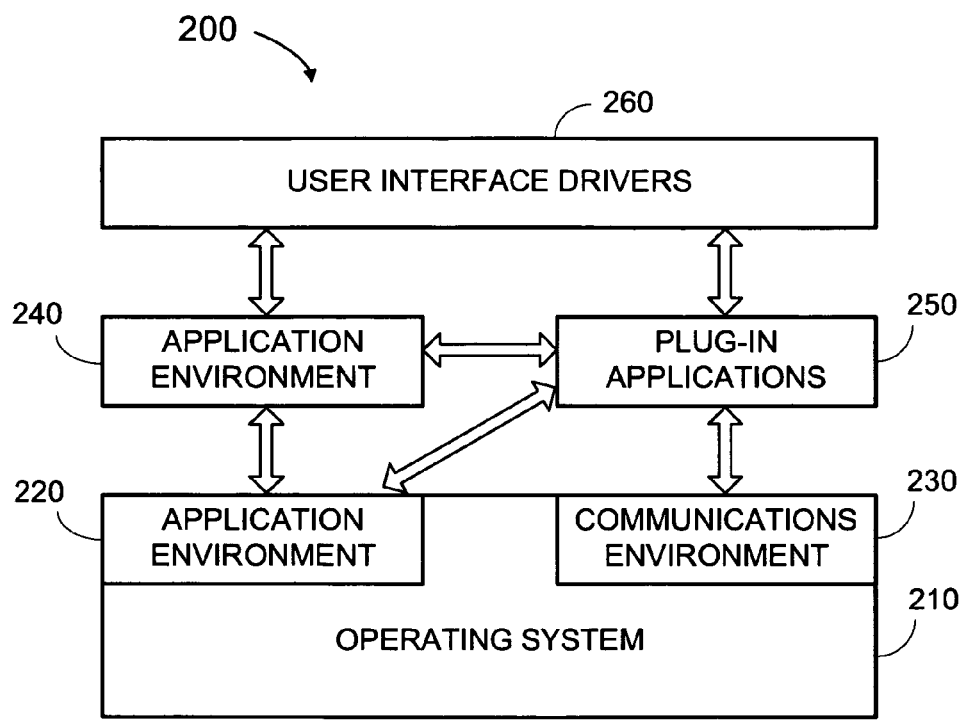
FIG. 6 is a block diagram of the software architecture of a telephone according to some embodiments.

FIG. 6 is a block diagram of a general software architecture that may be used within cellular telephone 20 in conjunction with some embodiments. Architecture 200 may operate to transmit a request to access a voice message mailbox to a voice mailbox provider, transmit caller information to the voice mailbox provider, and receive a voice message associated with the caller information from the voice mailbox provider.

Architecture 200 includes operating system 210, which may comprise architecture 100 of FIG. 5. In such a case, application environment 220 and communications environment 230 may correspond, respectively, to the connectivity framework and the connectivity plug-ins of architecture 100. Generally, application environment 220 provides a platform by which another application environment 240 may interface with operating system 210. Application environment 240 may comprise a Java™ or C programming environment. As such, plug-in applications 250 may be written in Java or C for execution by cellular telephone 20. Plug-in applications 250 may also be written for the application interface provided by application environment 220.

Communications environment 230 provides plug-in applications 250 with access to the communications functionality of operating system 210. This functionality may include text messaging, Web browsing and of course telephone communication. Plug-in applications 250 may also transmit data and commands to and receive input from user interface drivers 260 for control of the user interfaces of telephone 20.

Figure 7:
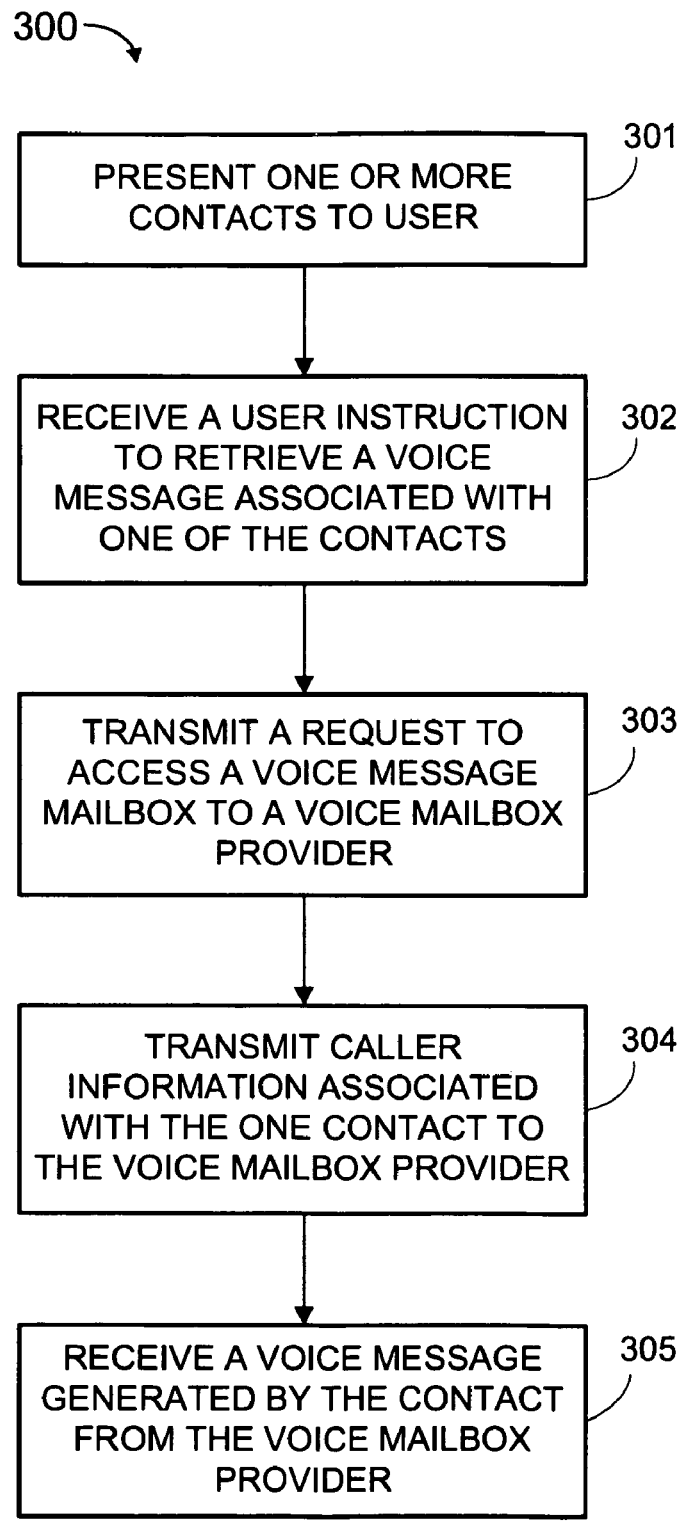
FIG. 7 is a flow diagram of a process according to some embodiments.

FIG. 7 is a flow diagram of process 300 according to some embodiments. In the foregoing description, process 300 will be described as if embodied in program code of one of plug-in applications 250. As described above, such program code may be executable within a multi-platform environment such as application environment 240 and/or within the environment provided by application environment 220. The described processes may also or alternatively be embodied in native program code of telephone 20.

Initially, at 301, one or more contacts are presented to a user. The contacts may be presented in any perceptible form, including but not limited to visual and aural. The contacts may include one or more of a name, a telephone number, an address, and any other information that may be associated with a person or entity capable of generating a voice message. According to some embodiments of 301, an indicator is also presented to indicate that a voice message was received from one or more of the presented contacts.

Figure 8:
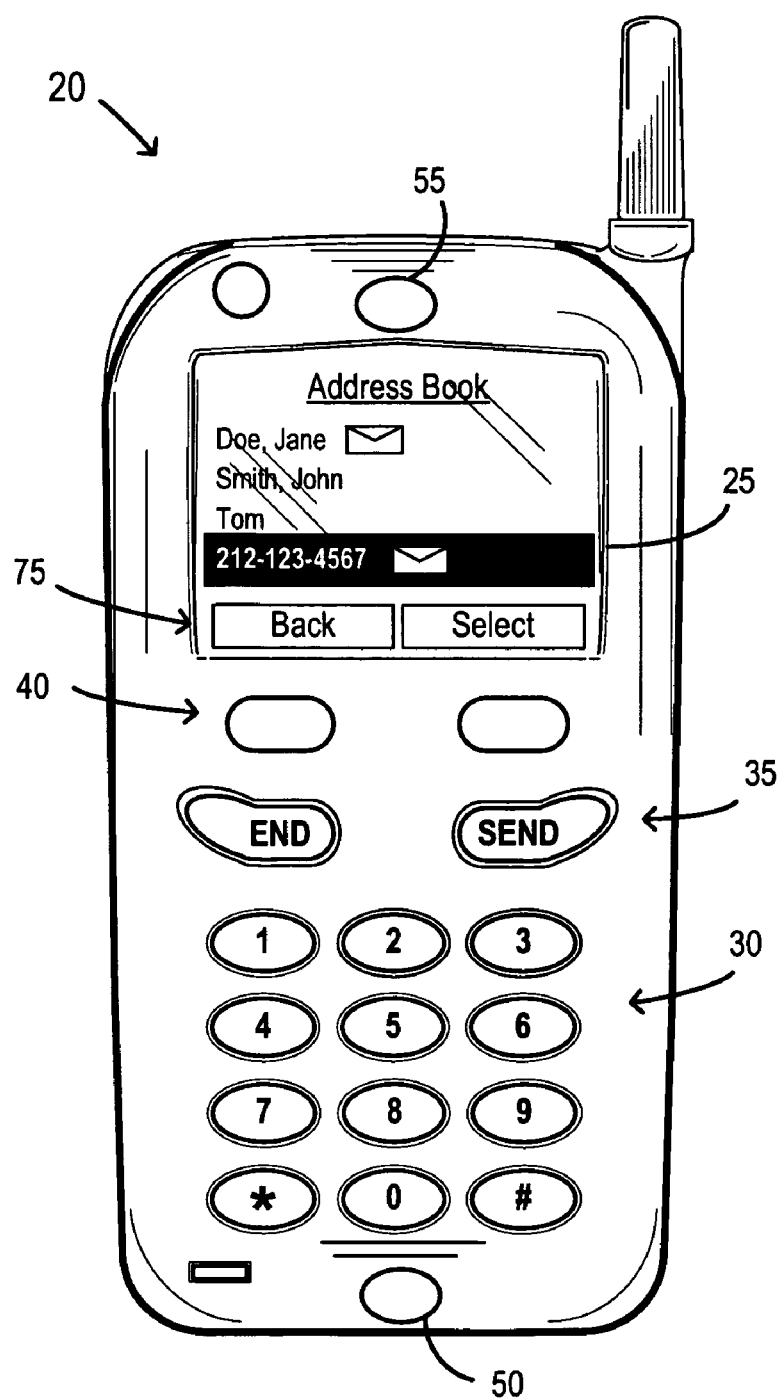
FIG. 8 is an outward view of a telephone according to some embodiments.

FIG. 8 is an outward view of telephone 20 at 301 according to some embodiments. As shown, display 25 presents several contacts. The contacts may be presented in response to user activation of an Address Book function provided by telephone 20. More specifically, a user may operate keypad 30 and/or keys 75 to launch an Address Book application prior to process 300. The presented contacts may be stored in memories 80 and/or 85 by the user using keypad 30 or any other system for inputting data to telephone 20, including but not limited to a Universal Serial Bus or FireWire connection.

Two of the contacts illustrated in FIG. 8 are associated with indicators. According to some embodiments, each indicator indicates that a voice message was received from its respective associated contact. Further, the indicator may indicate that the user has not yet listened to the received voice message.

A user instruction may be received at 302. The instruction may comprise an instruction to retrieve a voice message that is associated with one of the presented contacts. Continuing with the above example, the user may operate telephone 20 at 302 to select a contact that is presented on display 25 in association with an indicator. In response, telephone 20 may present options such as those illustrated in FIG. 9.

Figure 9:
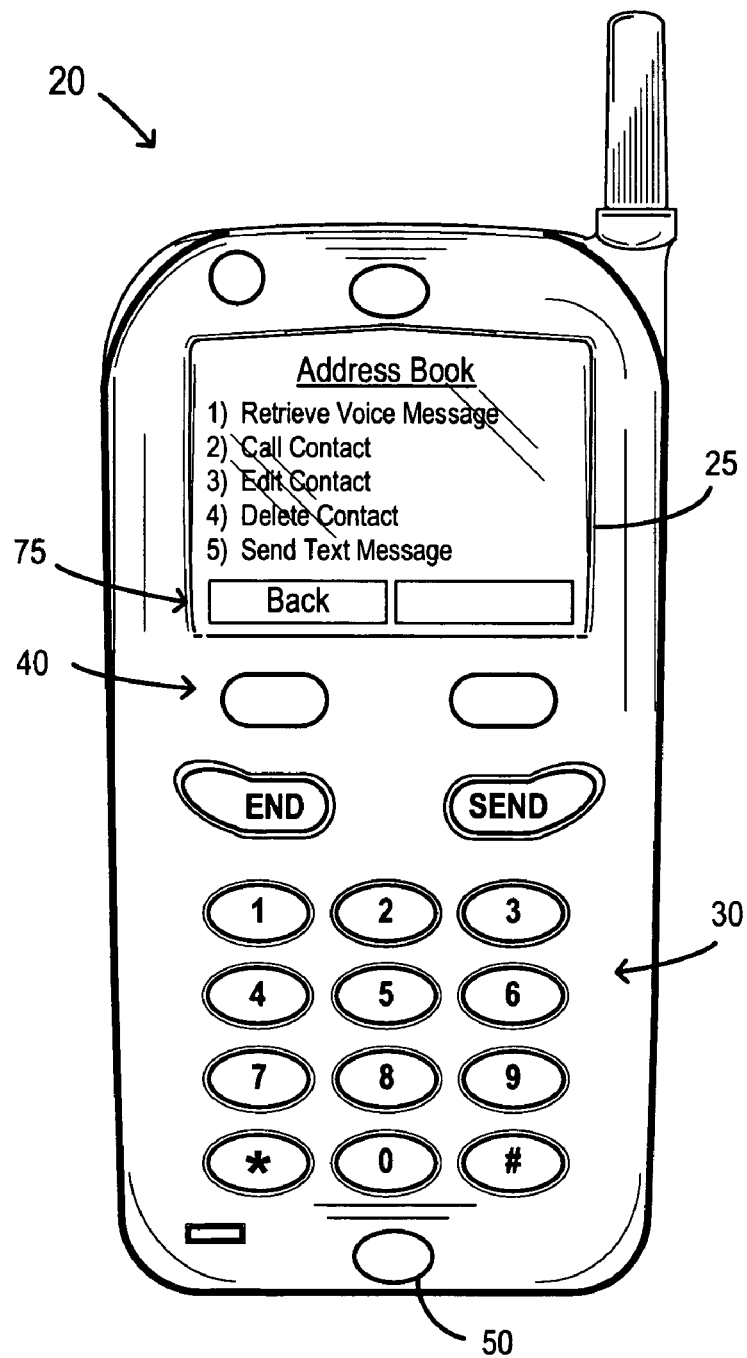
FIG. 9 is an outward view of a telephone according to some embodiments.

FIG. 9 shows several functions that may be selectably executed with respect to the selected contact. According to the present example, the user issues a user instruction to retrieve a voice message by depressing the ""1" key of keypad 30 at 302 to select the "Retrieve Voice Message" function. In some embodiments, this function is presented and/or selectable only if the selected contact is associated with an indicator as shown in FIG. 8.

A request to access a voice message mailbox is transmitted to a voice mailbox provider at 303 in response to the user instruction. The voice message mailbox may be associated with the user of telephone 20. That is, the voice message mailbox may store voice messages intended for the user.

Figure 10:
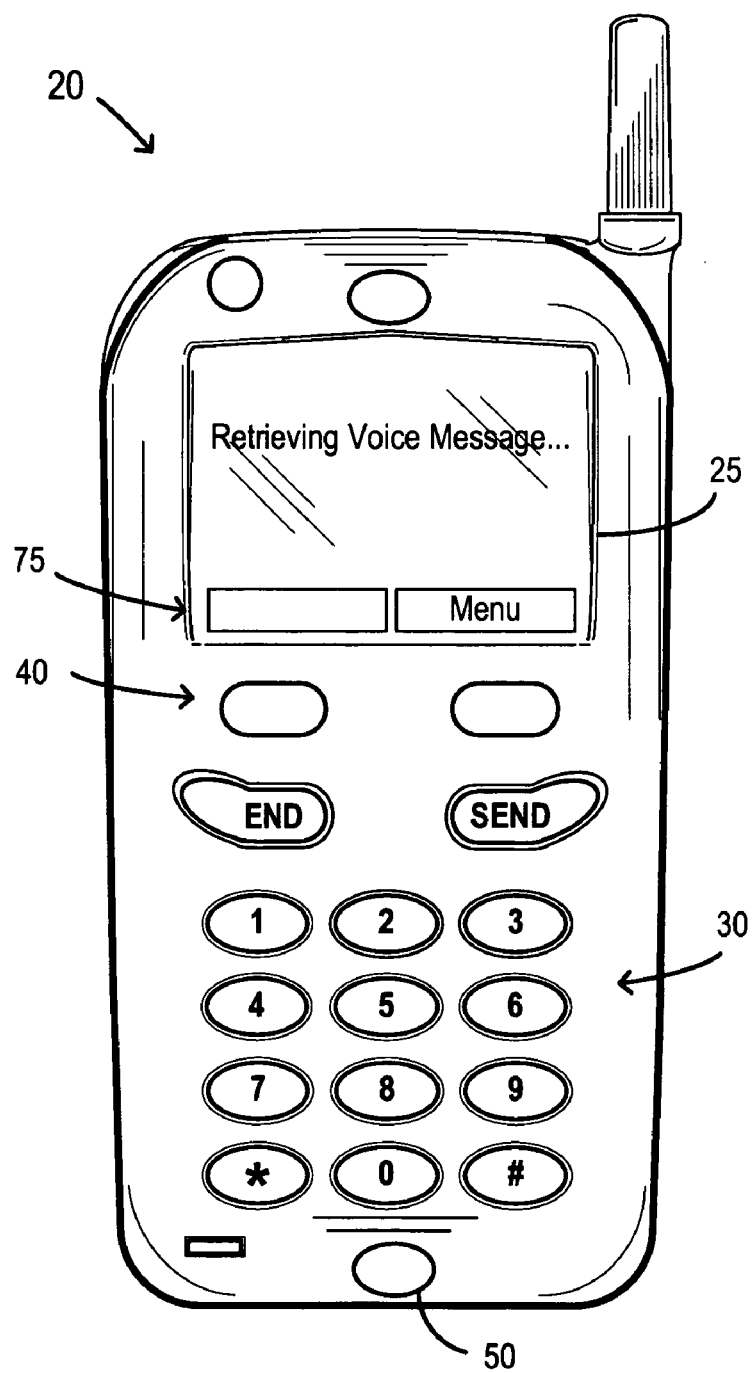
FIG. 10 is an outward view of a telephone according to some embodiments.

The transmission may comprise a request to initiate a voice call connection that complies with a voice call protocol supported by the voice mailbox provider. In this regard, telephone 20 may store a telephone number associated with the voice mailbox provider, and transmit the request from antenna 70 using the telephone number. FIG. 10 depicts information that may be presented by display 25 in some embodiments of 303. Display 25 may continue to present the information of FIG. 10 during the remainder of process 300.

After determining that the voice mailbox provider has answered the voice call, telephone 20 may transmit information identifying the voice message mailbox for which access is requested and any authorization information that may be required to access the voice message mailbox. As mentioned above, any other system for interacting with a voice mailbox provider to access a voice message mailbox may be employed.

Either before or after access to the voice message mailbox is granted, caller information is transmitted to the voice mailbox provider at 304. The caller information is associated with the selected contact. The caller information may comprise a telephone number of the contact and/or any other information that may be used by the voice mailbox provider to identify messages generated by the caller.

A voice message is then received from the voice mailbox provider at 305. The voice message was generated by the selected contact. In this regard, the voice mailbox provider may store a received voice message in association with information identifying the caller who generated the message. The information may comprise a telephone number determined from Caller ID data that was transmitted to the provider by the caller when the voice message was generated. Therefore, the voice mailbox provider may identify a voice message generated by the selected contact by identifying stored voice messages that are associated with the telephone number that was transmitted at 304.

Telephone 20 may automatically present the voice message to the user via speaker 55 after termination of process 300. Also or alternatively, telephone 20 may store the voice message for future playback. A termination request may be transmitted to end communication with the voice mailbox provider.

Figure 11:
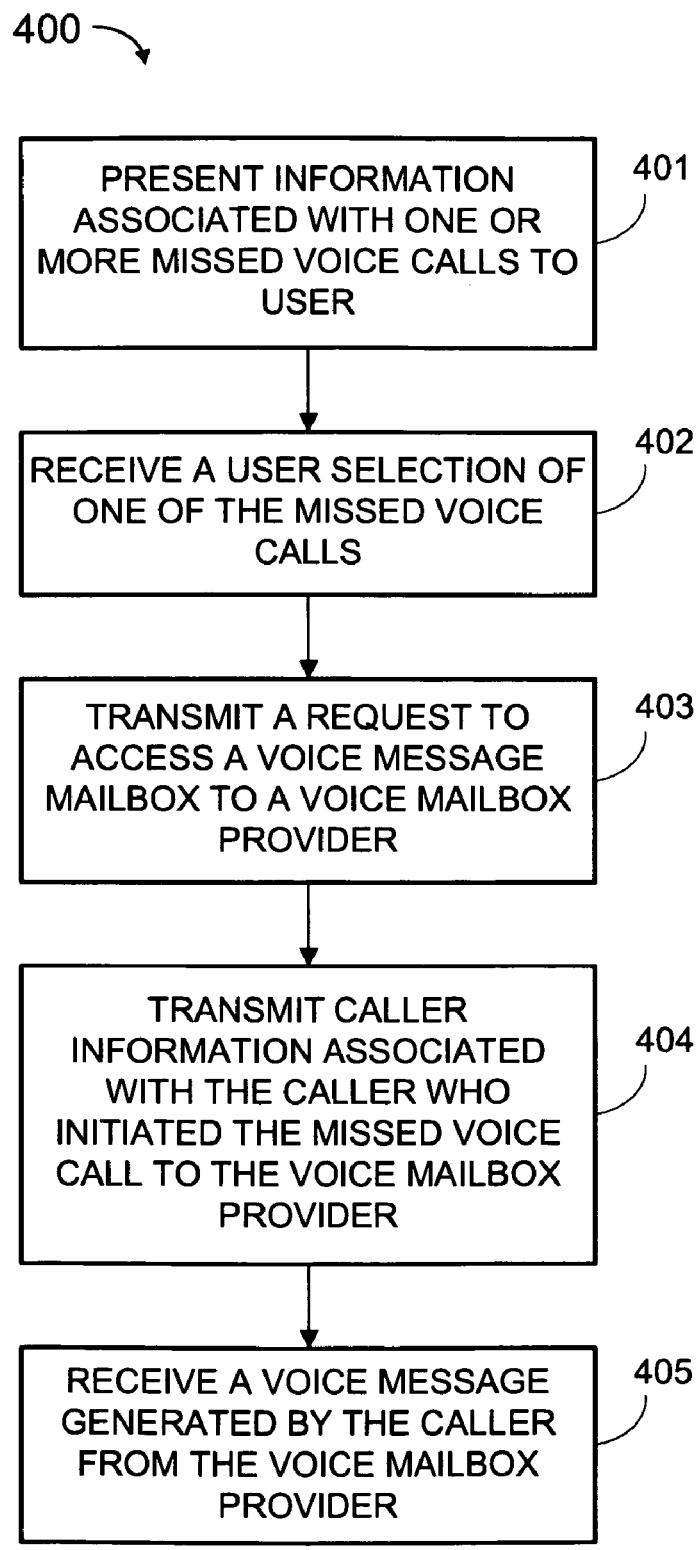
FIG. 11 is a flow diagram of a process according to some embodiments.

FIG. 11 is a flow diagram of process 400 according to some embodiments. Embodiments according to process 400 are generally directed to selective retrieval of a voice message associated with a missed voice call.

Information associated with one or more missed voice calls is presented to a user at 401. The information may include may include one or more of a name, a telephone number, an address, a time, and any other information that may be associated with an incoming call that was not answered (i.e., "missed. The information may also include an indicator indicating that one or more of the missed voice calls resulted in a stored voice message.

Figure 12:
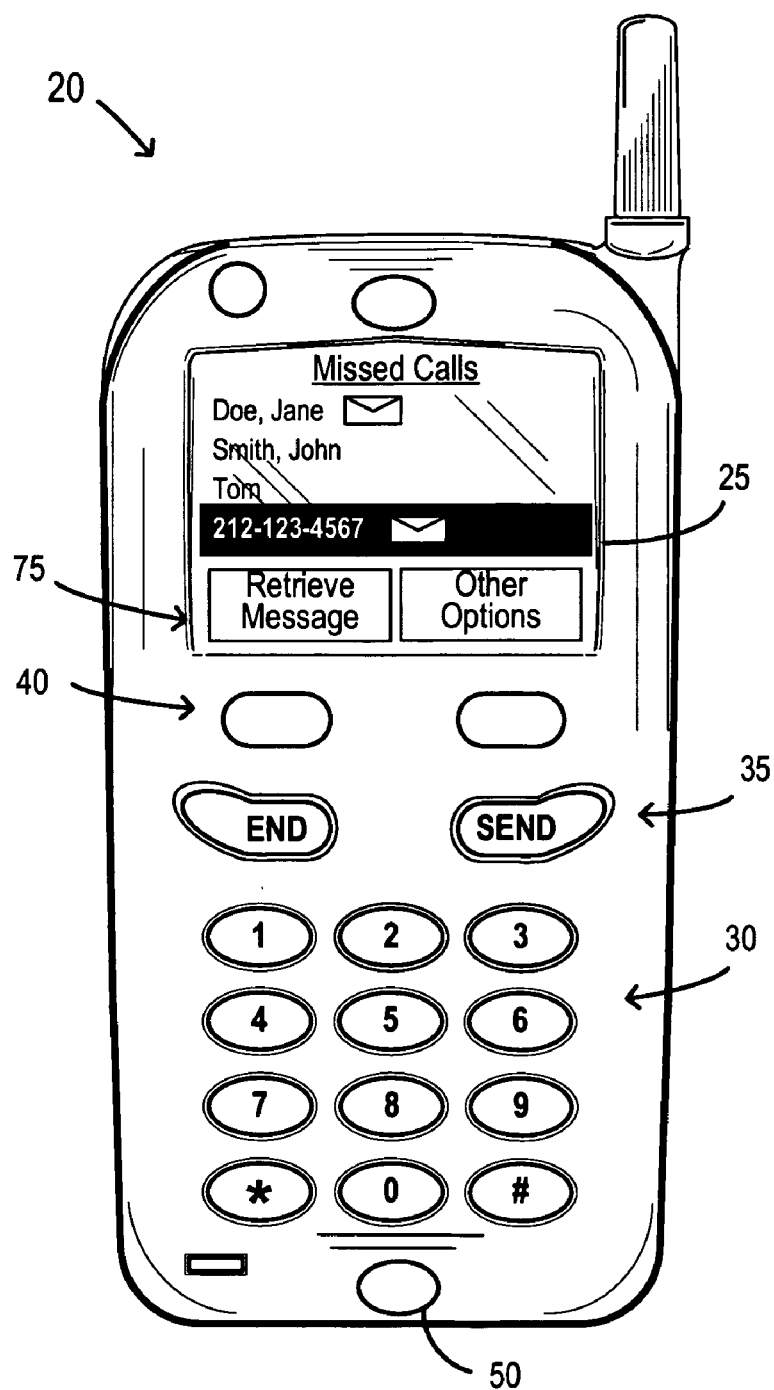
FIG. 12 is an outward view of a telephone according to some embodiments.

Telephone 20 of FIG. 12 presents information according to some embodiments of 401. The user may launch a Missed Calls function of telephone 20 in order to present the information. The information may be captured by telephone 20 while receiving calls that are not answered by the user. The information may include Caller ID information (e.g., name and telephone number), a timestamp, and may be stored in memories 80 and/or 85. The information may also include contact information stored in telephone 20 that corresponds to the captured information. For example, telephone 20 may store a nickname that corresponds to Caller ID information received with the incoming call, and present the nickname instead of the Caller ID information at 401.

Two of the missed calls are associated with indicators. Each indicator may indicate that its associated missed call resulted in a voice message. The indicator may also indicate that the user has not yet listened to the received voice message.

A user instruction of one of the missed voice calls is received at 402. In some embodiments of 402, the user operates telephone 20 to select information that is presented on display 25 in association with an indicator. The user may then select function key 40 to retrieve an associated voice message.

Next, at 403, a request to access a voice message mailbox is transmitted to a voice mailbox provider. The voice message mailbox may be associated with the user of telephone 20, and may store a voice message associated with the selected information. Such a voice message may therefore have been generated by a caller who initiated the missed call that is also associated with the selected information.

As described with respect to 303 above, the transmission may comprise a request to initiate a voice call connection that complies with a voice call protocol supported by the voice mailbox provider. Telephone 20 may also transmit information identifying the voice message mailbox for which access is requested and any authorization information that may be required to access the voice message mailbox. Accordingly, display 25 may appear as shown in FIG. 10 in some embodiments of 403, and may continue to appear in this form during the remainder of process 400.

Caller information is transmitted to the voice mailbox provider at 404. The caller information is associated with the caller who initiated the selected missed voice call. The caller information may comprise the user-selected information, a telephone number, name, or timestamp determined from Caller ID data associated with the missed call, and/or any other information that may be used by the voice mailbox provider to identify a voice message associated with a missed call.

A voice message is received from the voice mailbox provider at 405. The received voice message was generated by the caller who initiated the missed voice call. In some embodiments, the voice mailbox provider stores a received voice message in association with information that may comprise a time at which the voice message was generated, a telephone number determined from Caller ID data that was transmitted to the provider by the caller when the voice message was generated, and/or other information. The voice mailbox provider therefore identifies a voice message generated by the caller by identifying stored voice messages that are associated with the information that was transmitted at 404.

Again, telephone 20 may automatically present the voice message to the user via speaker 55 and/or may store the voice message for future playback.

Figure 13:
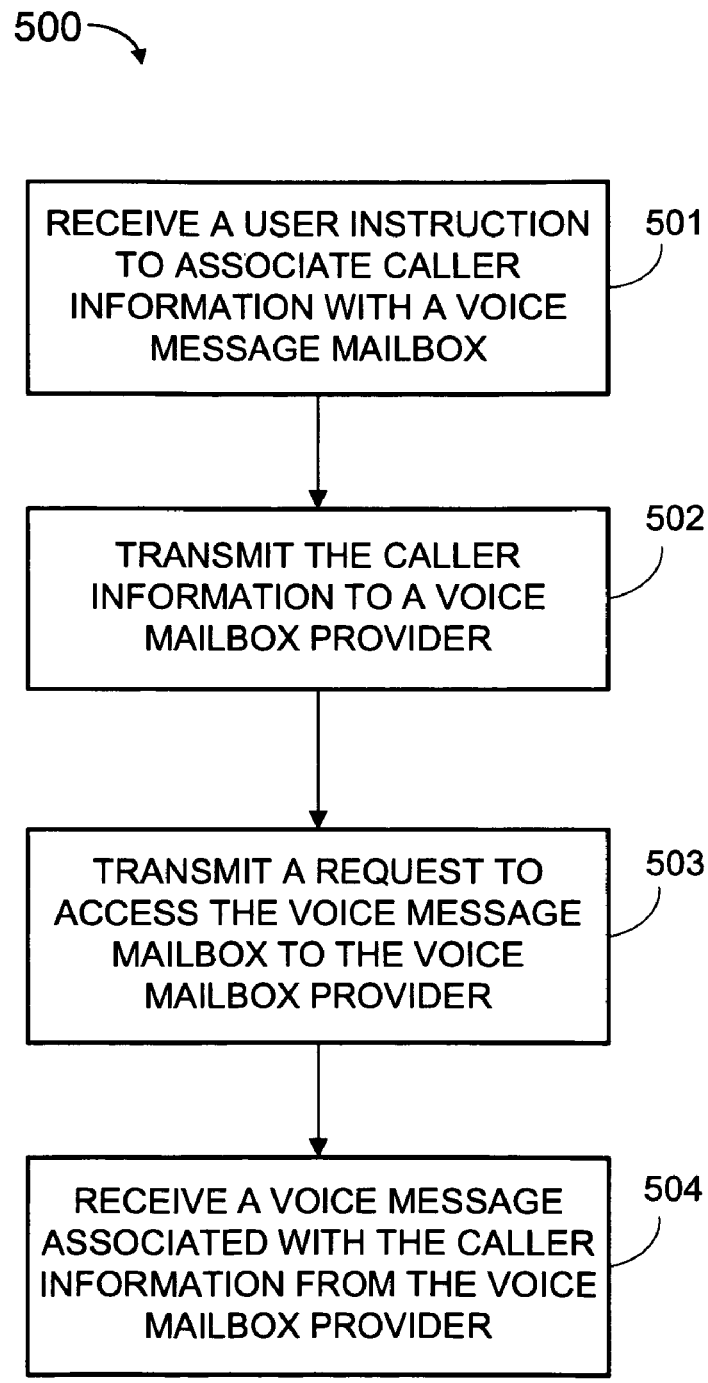
FIG. 13 is a flow diagram of a process according to some embodiments.

FIG. 13 is a flow diagram of process 500. Process 500 reflects some embodiments in which caller information is associated with a voice message mailbox, and a voice message associated with the caller information is requested and received from the voice mailbox thereafter.

Figure 14:
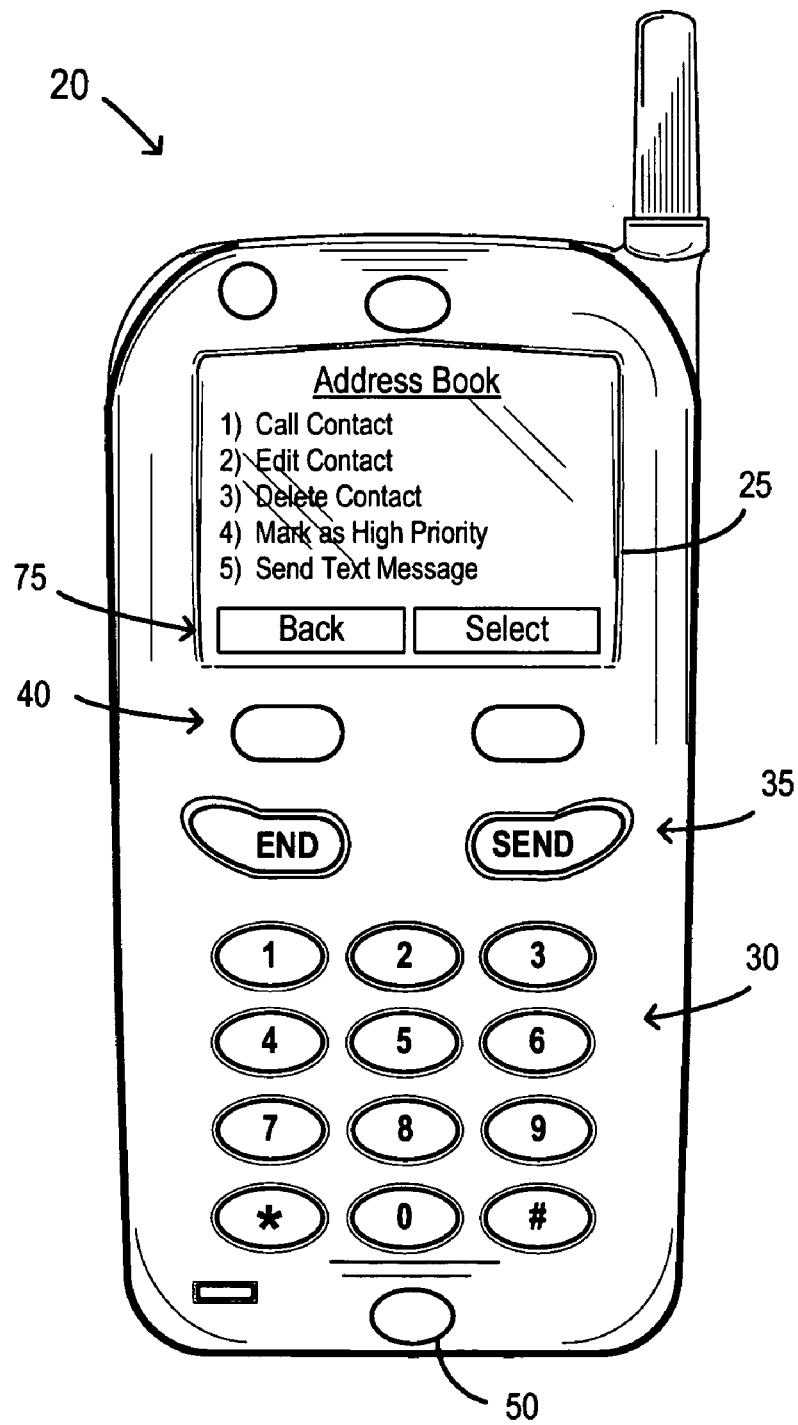
FIG. 14 is an outward view of a telephone according to some embodiments.

At 501, a user instruction to associate caller information with a voice message mailbox is received. According to some embodiments of 501, a user may operate telephone 20 to launch an Address Book function and to select a presented contact as described above. Display 25 may then present the user with the options shown in FIG. 14. Next, the user selects option "4) Mark as High Priority". Such a selection causes telephone 20 to receive an instruction to associate caller information with a "High Priority" voice message mailbox, wherein the caller information is associated with the selected contact.

The caller information is then transmitted to a voice mailbox provider at 502. Telephone 20 may establish contact with the voice mailbox provider at 502 as described above. Using any suitable protocol, the user and/or telephone 20 may then interact with the voice mailbox provider to transmit the caller information and to indicate that the caller information is to be associated with a "High Priority" mailbox. Such a protocol may require the user to navigate menus presented by the provider, or might not require any actions from the user. As a result of the transmission at 502, the mailbox provider is instructed to associate any voice messages that are associated with the caller information with the "High Priority" mailbox.

The caller information may be transmitted at 502 in response to receipt of the instruction at 501. In some embodiments, the caller information is transmitted only after receiving a request for the information from the voice mailbox provider. Such a request may be received by telephone 20 when the provider receives a voice message, periodically, or whenever telephone 20 establishes contact with the voice mailbox provider.

A request to access the voice message mailbox is then transmitted to the voice mailbox provider at 503. The request may be transmitted as described above. In some embodiments, the request includes a selection of the "High Priority" mailbox from among two or more selectable voice message mailboxes.

Figure 15:
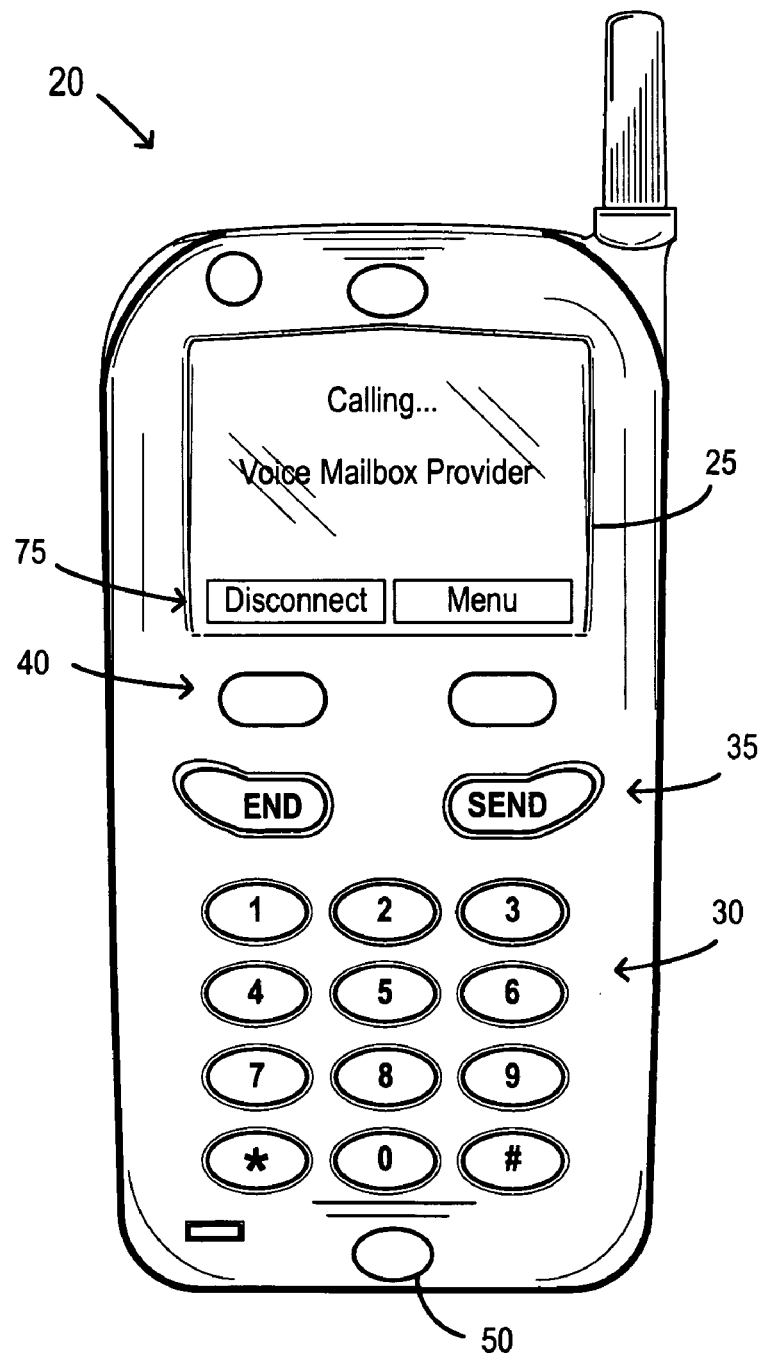
FIG. 15 is an outward view of a telephone according to some embodiments.

More specifically, the user may operate telephone 20 at 503 to transmit a request to access the "High Priority" voice message mailbox. This operation may include dialing a telephone number associated with the mailbox provider, inputting a keystroke sequence (e.g., pressing and holding the "1" key of keypad 30) for initiating a call to the mailbox provider, entering a Voice Mail menu and selecting an "Access Voice Mailbox" function, etc. FIG. 15 illustrates telephone 20 during this operation in accordance with some embodiments.

Figure 16:
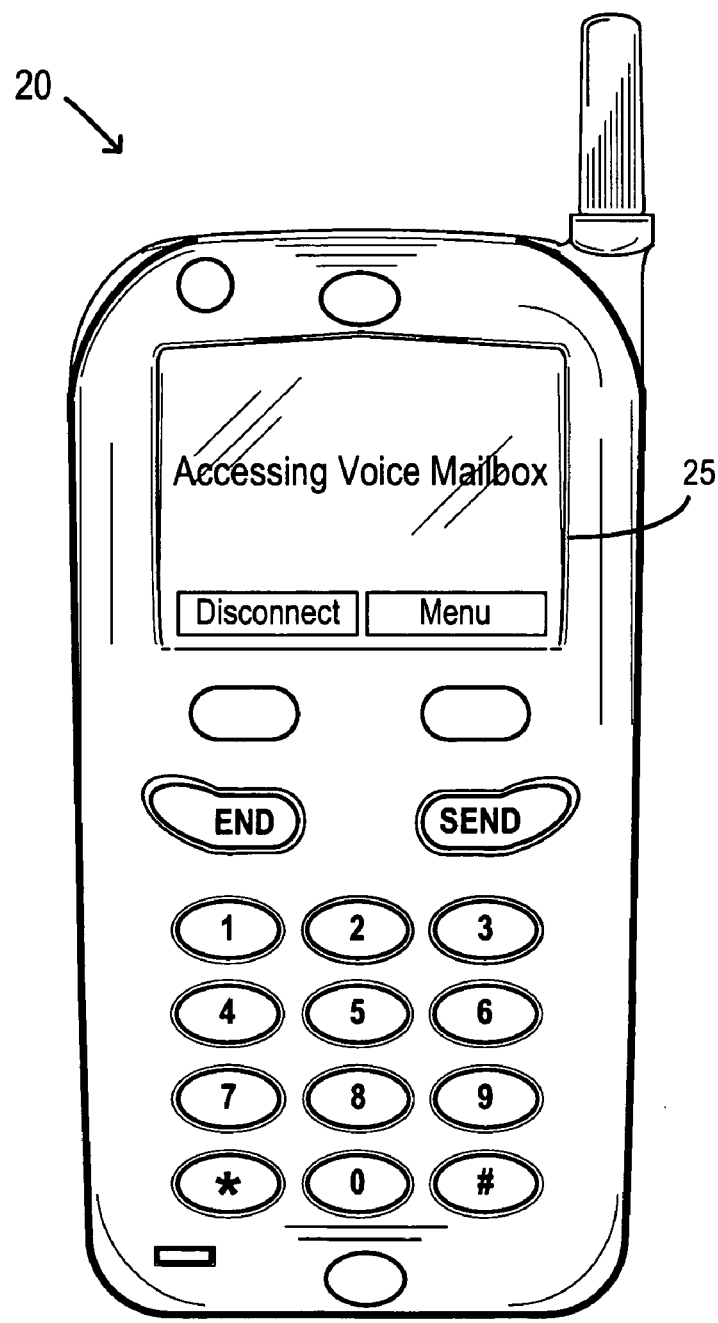
FIG. 16 is an outward view of a telephone according to some embodiments.

Once a session has been established between telephone 20 and the voice message mailbox provider, the provider may present options for accessing two or more voice message mailboxes. The user may select the "High Priority" mailbox from among the options in order to transmit the request at 503. Display 25 may present the information shown in FIG. 16 during the session.

A voice message is received from the voice mailbox provider at 505. The received voice message is associated with the subject voice mailbox and, by extension, with the caller information transmitted at 502. For example, between 502 and 503, the voice mailbox provider may receive a voice message and Caller ID data associated with the voice message. The provider then determines that the Caller ID data corresponds in some way to the caller information transmitted at 502 and, as a result, associates the voice message with the "High Priority" mailbox. Therefore, in response to the request that was transmitted at 503, the voice mailbox provider identifies the voice message as being associated with the voice mailbox and transmits the voice message to telephone 20.

Figure 17:
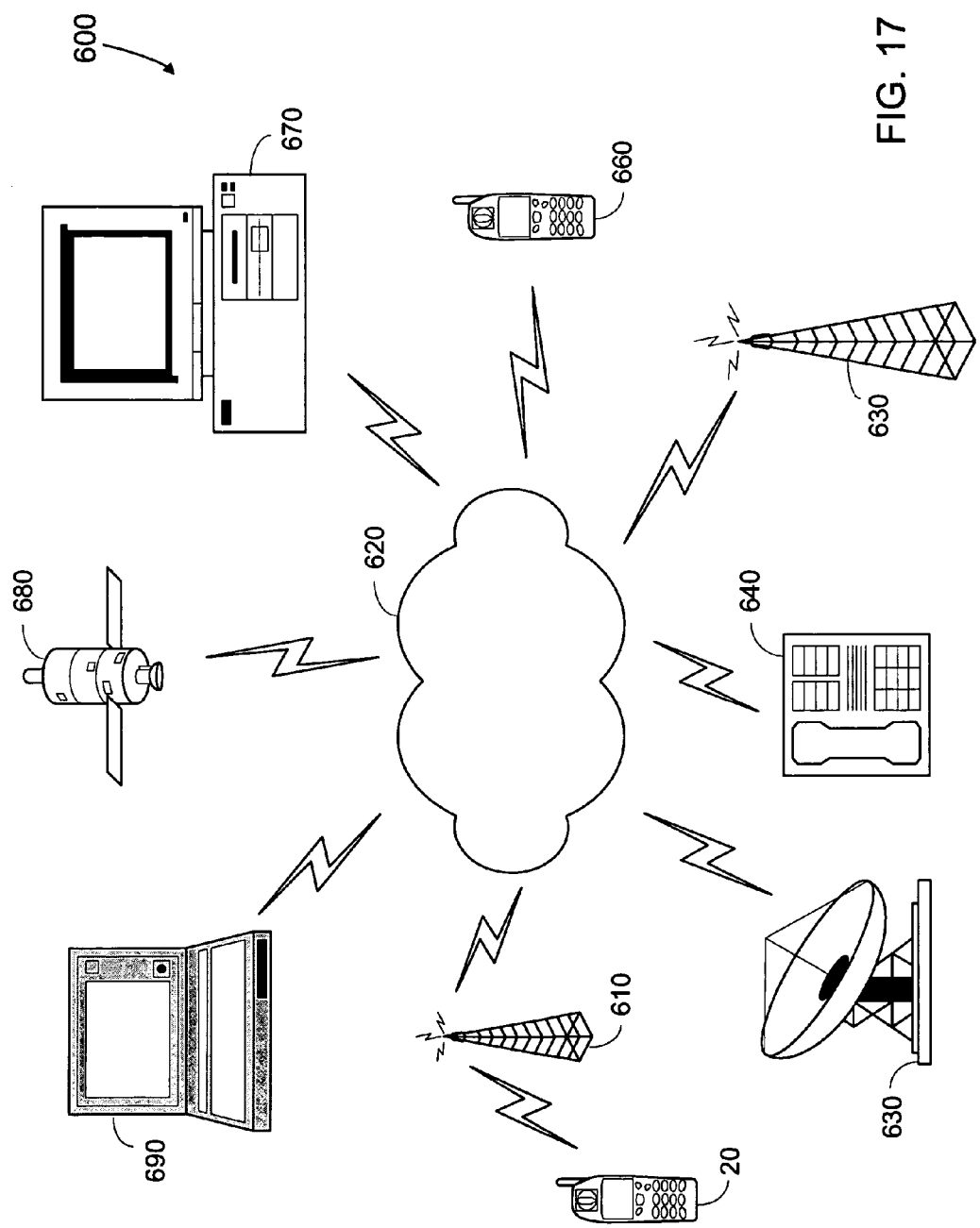
FIG. 17 is a diagram of a system architecture according to some embodiments.

The above-mentioned signals, voice calls, voice messages and text messages may pass through any number of networks, devices and protocols before reaching their intended recipient. In this regard, FIG. 17 is a partial diagram of a communication architecture 600 according to some embodiments.

Cellular telephone 20 is shown in communication with tower 610. Tower 610 may receive the transmission directly from antenna 70, and may forward the transmission to communication network 620 according to governing protocols. Communication network 620 may include any number of devices and systems for transferring data, including but not limited to local area networks, wide area networks, telephone networks, cellular networks, fiber-optic networks, satellite networks, infra-red networks, radio frequency networks, and any other type of networks which may be used to transmit information between devices. Additionally, data may be transmitted through communication network 620 using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

Devices 630 through 690 are examples of some devices that may be a part of or in communication with communication network 620. As such, devices 630 through 690 may receive text or voice messages, either as intended recipients or as network nodes for passing messages. Devices 630 through 690 include satellite transmitter/receiver 630, landline telephone 640 having a telephone line interface to receive a telephone line (e.g., a cordless phone or a corded phone), communication tower 650, cellular telephone 660, desktop computer 670, satellite 680 and laptop computer 690. Any other suitable devices may be used as a transmitting device or a receiving device in conjunction with some embodiments.

The elements of system 600 may be connected differently than as shown. For example, some or all of the elements may be connected directly to one another. Embodiments may include elements that are different from those shown. Moreover, although the illustrated communication links between the elements of system 600 appear dedicated, each of the links may be shared by other elements. Elements shown and described as coupled or in communication with each other need not be constantly exchanging data. Rather, communication may be established when necessary and severed at other times or always available but rarely used to transmit data.

Embodiments described above are not intended to be limited to the specific form set forth herein, but are intended to cover such alternatives, modifications and equivalents as can reasonably be included within the spirit and scope of the appended claims.

What is claimed is:

1. A method for voice message retrieval comprising:
    a voice mailbox provider receiving a selection of a caller that is to be associated with a first voice message and also receiving caller information for the caller that is to be associated with the first voice message mailbox, the voice mailbox provider comprising at least two voice message mailboxes comprising the first voice message mailbox and a second voice message mailbox;
the voice mailbox provider assigning the caller to the first voice message mailbox and associating the caller information with the caller so that a voice message left by the caller is retrievable from the first voice message mailbox by the voice mailbox provider based on the caller information;
receiving an incoming communication from the caller associated with the first voice message mailbox;
the voice mailbox provider detecting the caller information associated with the caller to identify the caller;
the voice mailbox provider receiving a voice message from the caller associated with the first voice message mailbox;
the voice mailbox provider associating the voice message with the caller information assigned to the first voice message mailbox and storing the voice message in the first voice message mailbox;
a communication device presenting an indicator to a user of the communication device, the indicator displaying information indicating that the voice message from the caller associated with the first voice message mailbox was received by the voice mailbox provider;
the communication device transmitting a request to access the voice message of the caller to the voice mailbox provider, the request comprising the caller information associated with the caller;
the voice mailbox provider retrieving the voice message from the first voice message mailbox based on the caller information provided in the request received from the communication device; and
the voice mailbox provider transmitting the voice message to the communication device for output at the communication device.

2. The method of claim 1 further comprising the indicator displaying information indicating that the incoming communication was associated with contact information contained in a contact list.

3. The method of claim 1 further comprising the communication device presenting the voice message to the user of the communication device and wherein the indicator displaying different information prior to receiving the voice message at the communication device than after the communication device presenting the voice message to the user.

4. The method of claim 1 further comprising the communication device providing information indicating that the incoming communication was not answered, the information indicating that the incoming communication was not answered comprises at least one of an identification number of the caller, an address of the caller, and a time that the incoming call was received at the communication device.

5. The method of claim 1 further comprising the communication device storing the received voice message for future playback.

6. The method of claim 1 further comprising the mailbox provider sending an information request for caller information to the communication device when the voice mailbox provider receives a voice message, periodically, or when the communication device contacts the voice mailbox provider.

7. The method of claim 1 further comprising the voice mailbox provider receiving authorization information from the communication device to access the at least two voice message mailboxes.

8. The method of claim 1 wherein the communication device transmitting the request to access the voice message of the caller to the voice mailbox provider comprises the communication device transmitting the request to access the voice message in response to a pressing and holding of a single key of the communication device.

9. The method of claim 1 wherein the caller is a first caller, the caller information is first caller information, the incoming communication is a first incoming communication, and the voice message of the first caller is a first voice message, the method further comprising:
the voice mailbox provider receiving a second selection of a second caller that is to be associated with the second voice message mailbox and also receiving second caller information for the second caller that is to be associated with the second voice message mailbox;
the voice mailbox provider assigning the second caller to the second voice message mailbox and associating the second caller information with the second caller so that a second voice message left by the second caller is retrievable by the voice mailbox provider based on the second caller information;
receiving a second incoming communication from the second caller associated with the second voice message mailbox;
the voice mailbox provider detecting the second caller information associated with the second caller to identify the second caller;
the voice mailbox provider receiving a second voice message from the second caller associated with the second voice message mailbox;
the voice mailbox provider associating the second voice message with the second caller information assigned to the second voice message mailbox and storing the second voice message in the second voice message mailbox;
the communication device presenting a second indicator to the user of the communication device, the second indicator displaying information indicating that the second voice message from the second caller associated with the second voice message mailbox was received by the voice mailbox provider;
the communication device transmitting a second request to access the second voice message mailbox to the voice mailbox provider, the second request comprising the second caller information associated with the second voice message mailbox;
the voice mailbox provider retrieving the second voice message from the second voice message mailbox based on the second caller information provided in the second request to access the second voice message in response to the second request; and
the voice mailbox provider transmitting the second voice message to the communication device for output at the communication device.

10. The method of claim 1 wherein the method is carried out according to a network protocol, the network protocol selected from the group consisting of Asynchronous Transfer Mode ("ATM"), Internet Protocol ("IP"), Hypertext Transfer Protocol ("HTTP"), and Wireless Application Protocol ("WAP").

11. A system for message retrieval comprising:
a communication device;
a voice mailbox provider comprising at least two voice message mailboxes, the at least two voice message mailboxes comprising a first voice message mailbox and a second voice message mailbox;
the voice mailbox provider receiving a selection of a first caller that is to be associated with the first voice message mailbox and also receiving first caller information for the first caller that is to be associated with the first voice message mailbox;

the voice mailbox provider assigning the first caller to the first voice message mailbox and associating the first caller information with the first caller so that a first voice message left by the first caller is retrievable by the voice mailbox provider based on the first caller information;

the communication device receiving an incoming communication from the first caller;

the voice mailbox provider detecting the first caller information associated with the first caller to identify the first caller;

the voice mailbox provider receiving a first voice message from the first caller;

the voice mailbox provider associating the first voice message with the first caller information assigned to the first voice message mailbox and storing the first voice message in the first voice message mailbox;

the communication device presenting a first indicator to a user of the communication device, the first indicator displaying information indicating that the first voice message from the first caller was received by the voice mailbox provider;

the communication device transmitting a first request to access the first voice message to the voice mailbox provider, the first request comprising the first caller information;

the voice mailbox provider retrieving the first voice message from the first voice message mailbox based on the first caller information in the first request corresponding with the first caller information associated with the first voice message; and the voice mailbox provider transmitting the first voice message to the communication device for output at the communication device.

12. The system of claim 11 wherein the communication device has a non-transitory computer readable medium, the communication device storing a contact list in the non-transitory computer readable medium, and wherein the selection of the caller is made by selecting a contact from the contact list.

13. The system of claim 11 wherein the communication device outputs the first voice message to the user of the communication device at a speaker of the communication device and wherein the indicator displays different information prior to the communication device receiving the first voice message than after the communication device presents the first voice message.

14. The system of claim 11 wherein the indicator indicating that the incoming communication was not answered comprises at least one of an identification number of the caller, an address of the caller, and a time that the incoming call was received at the communication device.

15. The system of claim 11 wherein the communication device stores the received first voice message for future playback.

16. The system of claim 11 wherein the voice mailbox provider transmits a first information request for caller information to the communication device when the voice mailbox provider receives a voice message, periodically, or when the communication device contacts the voice mailbox provider.

17. The system of claim 11 wherein the voice mailbox provider receives authorization information from the communication device to access the first voice message mailbox.

18. The system of claim 11 wherein the communication device transmits the request to access the first voice message in response to a pressing and holding of a single key of the communication device.

19. The system of claim 11 further comprising:

the voice mailbox provider receiving a second selection of a second caller that is to be associated with the second voice message mailbox and also receiving second caller information for the second caller that is to be associated with the second voice message mailbox;

the voice mailbox provider assigning the second caller to the second voice message mailbox and associating the second caller information with the second caller so that a second voice message left by the second caller is retrievable by the voice mailbox provider based on the second caller information;

the communication device receiving a second incoming communication from the second caller associated with the second voice message mailbox;

the voice mailbox provider detecting the second caller information associated with the second caller to identify the second caller;

the voice mailbox provider receiving a second voice message from the second caller associated with the second voice message mailbox;

the voice mailbox provider associating the second voice message with the second caller information assigned to the second voice message mailbox and storing the second voice message therein based on the detected second caller information;

the communication device presenting a second indicator to the user of the communication device, the second indicator displaying information indicating that the second voice message was received by the voice mailbox provider;

the communication device transmitting a second request to access the second voice message to the voice mailbox provider, the second request comprising the second caller information associated with the second voice message mailbox;

the voice mailbox provider retrieving the second voice message from the second voice message mailbox based on the second caller information provided in the second request corresponding with the second contact information associated with the stored second voice message; and the voice mailbox provider transmitting the second voice message to the communication device for output at the communication device.

20. The system of claim 11 wherein the communication device is a cellular telephone, a personal digital assistant, a digital media player, or a wireless email device.

* * * * *